Oct. 2, 1962 W. ISLER 3,056,632
PNEUMATIC CONVEYOR
Filed Nov. 3, 1959 2 Sheets-Sheet 1
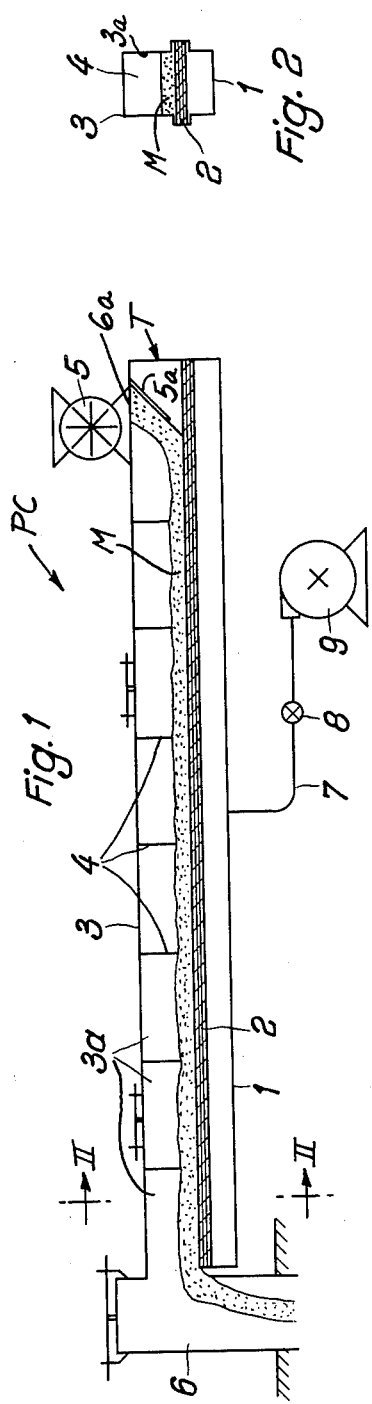
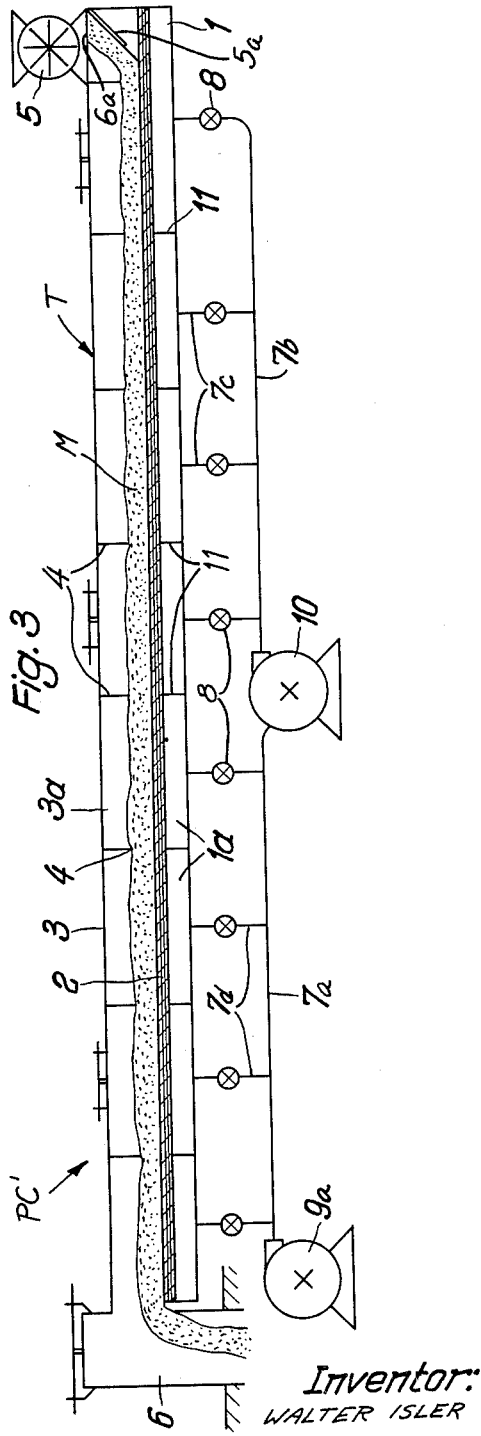
Inventor:
WALTER ISLER
BY Michael S. Striker
ATTORNEY Oct. 2, 1962 W. ISLER 3,056,632
PNEUMATIC CONVEYOR
Filed Nov. 3, 1959 2 Sheets-Sheet 2
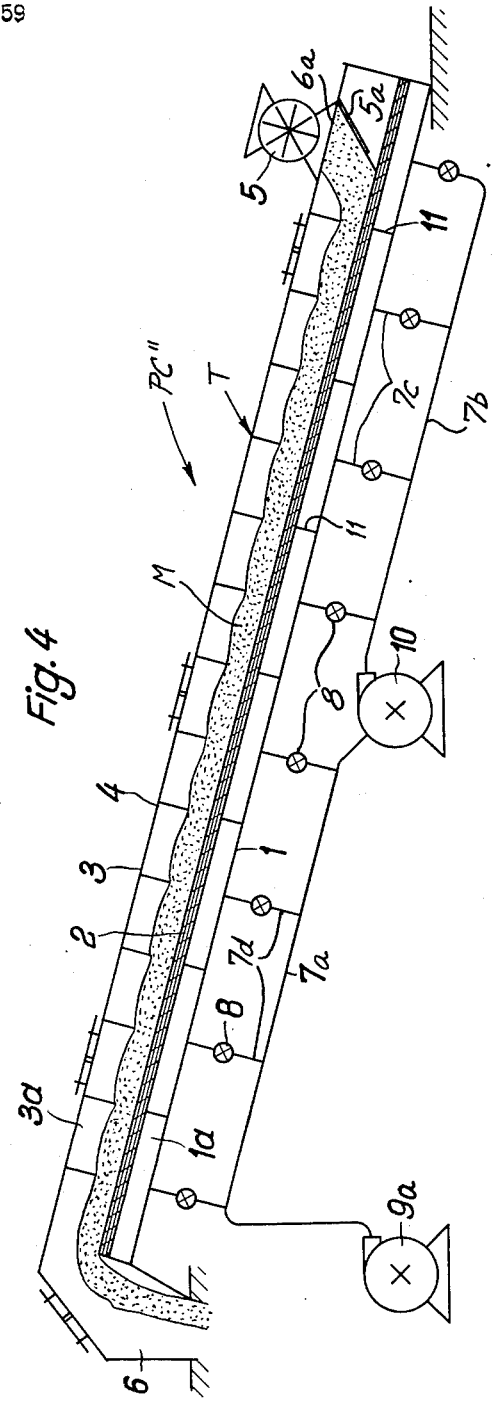
Inventor:
WALTER ISLER
BY Michael S. Striker
ATTORNEY United States Patent Office 3,056,632
Patented Oct. 2, 1962

3,056,632
PNEUMATIC CONVEYOR
Walter Isler, Moriken, Aargau, Switzerland, assignor to Cementfabrik Holderbank-Wildegg A.G., Holderbank, Aargau, Switzerland
Filed Nov. 3, 1959, Ser. No. 850,659
Claims priority, application Switzerland Nov. 7, 1958
10 Claims. (Cl. 302—31)

The present invention relates to conveyors in general, and more particularly to a pneumatic conveyor for cement and like pulverulent materials.

It is already known to utilize pneumatic conveyors for the transportation of pulverulent material, particularly cement and flour, and many known pneumatic conveyors have found wide acceptance for such purposes. In order to bring about the flow of pulverulent material, the presently known pneumatic conveyors are at least slightly inclined in a downward direction from the inlet toward the discharge end, and the inclination usually varies between 5 and 10 percent. This is a decided disadvantage because the use of an inclined conveyor renders it necessary to increase the height of such constructions in order to impart to the conveying trough the desired degree of inclination. The difference between the height of inlet and discharge ends in such conveyors increases proportionally with the overall length, i.e. with the distance which the conveyed pulverulent material must cover between the inlet and the discharge end of the apparatus. When a comparatively long conveyor is utilized, it is necessary to provide special gangways in order to render accessible certain more elevated zones of the conveying trough. This raises the overall cost of the conveyor and brings about the additional drawback that a large space is necessary for the installation of such apparatus. A further serious disadvantage of known pneumatic conveyors is that they cannot advance the pulverulent material from a lower to a higher point.

An important object of the present invention is to provide a pneumatic conveyor for pulverulent material which is capable of conveying the goods in a horizontal as well as in an upwardly inclined plane.

Another object of the invention is to provide a pneumatic conveyor of the above outlined characteristics which is capable of advancing comparatively large quantities of pulverulent material over shorter or longer distances, as well as along upwardly sloping surfaces of variable inclination.

A further object of the invention is to provide a pneumatic conveyor of the above described type which operates with little or no losses in compressed air, which occupies little space, which consists of a small number of component parts, and which may be utilized for transport of a wide variety of pulverulent and comminuted substances.

With the above objects in view, the invention resides in the provision of a pneumatic conveyor which comprises a closed conveying trough formed with an inlet opening and a discharge opening, feeding means arranged in such a way as to prevent escape of compressed gas when the pulverulent material is fed through the inlet opening, a perforated bottom located in and extending longitudinally within the conveying trough to serve as a guideway for the pulverulent material, a plurality of transverse substantially vertical baffles in the conveying trough located above and extending downwardly toward but short of the perforated bottom to define a plurality of communicating pressure chambers, and a system for introducing a compressed gas into the conveying trough at one or more points below the perforated bottom. The pulverulent material which is introduced through the inlet opening of the sealed trough is deposited on the perforated bottom and, owing to the action of compressed gas which penetrates upwardly through the perforated bottom, is transformed into a liquid-like eddying stream to form a layer of loose particles which extends between the perforated bottom and the lower ends of the baffles in the upper half of the trough. The pressure of gases entrapped in the chambers above the material layer drops in a direction toward the discharge opening. Owing to such differences in the pressure of gases which fill the adjacent communicating pressure chambers, the entrapped compressed gases tend to escape through the stream of loose material below the partitions or baffles and entrain the material in a direction toward the discharge opening.

The perforated bottom also serves as a means for admitting compressed gas from the lower half of the horizontal or upwardly inclined conveying trough into the pressure chambers or compartments thereabove. As the gas entrapped in the chambers located closer to the discharge opening must cover a shorter distance on its way to the point of escape from the conveyor, the pressures prevailing in the chambers increase in a direction from the discharge toward the inlet opening of the system, and such pressure differences are responsible for the travel of puverulent material toward the discharge opening because of the natural tendency of gases to flow from a zone of higher pressure toward the zone of lower pressure.

The efficiency and economy of the system may be increased if the lower half of the sealed receptacle or trough below the perforated bottom also contains a number of spaced substantially vertical partitions to subdivide the lower half of the trough into a series of lower pressure chambers or compartments. The lower partitions in a horizontal conveyor may be aligned with the upper partitions or baffles, i.e. the length of the upper and lower pressure chambers may be the same. Each lower chamber may be connected with a source of compressed gas by means of a separate conduit, and each conduit may be controlled by a separate pressure regulating valve, whereby any desired pressure differences may be established in the adjacent pressure chambers above the perforated bottom. This is particularly important if the conveyor trough is one of considerable length. In such instances, it is advisable to provide two or more compressors or blowers and to arrange the conduits in such a way that gases already compressed in one of the compressors thereupon enter one or more additional compressors, i.e. to impart to the gases different degrees of pressure. The gases at lower pressure are introduced into the pressure chambers closer to the discharge end while the more compressed gases pass into the chambers adjacent to the inlet opening. Such arrangement prevents unnecessary losses owing to the escape of compressed gases through the discharge opening. The number of compression stages depends upon the length of the conveyor. If the conveyor is inclined in upward direction, i.e. if its discharge end is above the inlet opening, it is advisable to increase the number of pressure chambers above the perforated bottom, i.e. to provide say two, three or even more upper pressure chambers for each lower pressure chamber.

The novel features which are considered as characteristic for the invention are set forth in particular in the appended claims. The invention itself, however, both as to its construction and its method of operation, together with additional objects and advantages thereof, will be best understood from the following detailed description of three specific embodiments when read in connection with the accompanying drawings, in which:

FIG. 1 is longitudinal section through one form of the pneumatic conveyor embodying my invention in which the pressure chambers are formed only in the upper half of the conveying trough;

FIG. 2 is a transverse section taken along the line II—II of FIG. 1, as seen in the direction of arrows;

FIG. 3 is longitudinal section through a modified conveyor with two sources of compressed gas and with pressure chambers formed in both halves of the conveying trough; and FIG. 4 is a longitudinal section through a pneumatic conveyor which is similar to the one shown in FIG. 3 with the exception that the upper half of the conveying trough contains a larger number of pressure chambers and that the discharge end or outlet is at a level above the level of the material inlet.

Referring now in greater detail to the illustrated embodiments, and first to FIGS. 1 and 2, there is shown a pneumatic conveyor PC which comprises a closed horizontal tubular receptacle or trough T formed at one of its ends with an inlet opening 6a for the powdery material M and with a material outlet or discharge opening 6 at its other end. The inlet opening 6a is sealed by a material feeding device 5 which may assume the shape of a hopper and is constructed in such a way as to prevent escape of compressed gas, i.e. air, through the inlet opening 6a. The hopper 5 may comprise a cylindrical container with paddle wheels to urge the material toward the inlet 6a without permitting air to escape from the container. The trough T comprises an elongated lower portion or half 1 and an elongated upper half or portion 3 with an airpermeable horizontal bottom 2 therebetween. This airpermeable bottom or horizontal partition may consists of porous plates, textile bands, wire mesh or any combination of such substances. The inlet 6a is provided above the perforated bottom 2, and the outlet 6 communicates with the upper trough portion 3. The material M, e.g. cement or any other flour-like product, is discharged by the feeding means 5 and passes through the inlet opening 6a along the inclined chute 5a onto the porous bottom 2 to be thereupon advanced along the member 2 toward and through the discharge opening or outlet 6 by a pneumatic system which comprises a source of compressed gas, such as an air compressor or blower 9, a conduit 7 which connects the compressor with the interior of the receptacle T below the bottom 2, i.e. with the interior of the lower trough portion or half 1, and a pressure regulating and shut-off valve 8 which is installed in the conduit 7. The interior of the upper trough portion or half 3 is subdivided into a series of pressure chambers or compartments 3a by a plurality of transverse substantially vertical and preferably uniformly spaced baffles or partitions 4 which extend downwardly from the cover plate of the trough and terminate immediately adjacent and above the loose stream of material M which flows along the perforated bottom 2 in a direction toward the discharge opening 6.

The compressed fluid medium discharged by the blower 9 through the conduit 7 into the lower half 1 of the receptacle or trough T penetrates through the porous bottom 2 and causes the pulverulent material M to assume a form not unlike a liquid stream. The pressure of compressed air below the bottom 2 is uniform throughout the entire lower half 1. The baffles 4, which may be made of sheet metal or any like material, prevent unobstructed flow of compressed air toward the discharge opening 6 because, as best shown in FIG. 1, their lower ends extend all the way to the material layer on the perforated bottom 2. Thus, compressed air is entrapped in the chambers 3a whereby maximum pressure prevails in the chamber or compartment closest to the inlet opening 6a. The pressure in adjacent chambers 3a drops in a direction toward the discharge opening 6, i.e. a difference exists between the pressure of air entrapped in each pair of adjacent chambers. Such pressure differences urge the material M which, as stated hereinabove, assumes the form of a liquid stream, in a direction toward the discharge opening of the trough T. In other words, the action of compressed air entering the trough T through the conduit 7 upon the material M is twofold, namely, the compressed air passing through the perforated bottom 2 causes the pulverulent substance to assume the form of an eddying stream of loose particles and the air entrapped in the communicating chambers 3a causes the material to advance along the bottom 2 and beneath the successive partitions 4 in a direction toward the discharge opening. The material travels from the chambers containing air under higher pressure toward the chambers in which the pressure of entrapped air is lower, i.e. the discharge end of the trough T need not be at a level below the level of the material inlet. This simplifies the construction, mounting and the cost of the conveyor.

Considerable pressure differences will develop between the air entrapped in chambers 3a close to the discharge end 6 and the air in the lower trough portion or half 1 therebelow. Thus, rather large quantities of compressed air may escape through the opening without contributing to the advance of material M along the perforated bottom 2. This may be avoided if, as shown in FIG. 3, the lower portion or half 1 of the trough T is also subdivided into a series of pressure chambers or compartments. The modified pneumatic conveyor PC' of FIG. 3 comprises a plurality of transverse preferably vertical partitions 11 which extend from the base plate of the lower half 1 and all the way to the perforated bottom 2 to subdivide the lower half of the conveying trough T into a series of compartments 1a. Each lower partition 11 is in vertical alignment with an upper partition or baffle 4, i.e. the length of compartments or chambers 1a and 3a is the same. Adjacent pressure chambers 1a are airtightly sealed from each other, i.e. the partitions 11 are not permeable to gases, and compressed air introduced into the compartments or chambers 1a can escape only in upward direction by passing through the perforated bottom 2.

The means for feeding compressed air to the lower chambers 1a comprises a first compressor or blower 9a, a second compressor 10, a first conduit 7a which connects the compressor 9a with the compressor 10, a second conduit 7b which connects the compressor 10 with the interior of chamber 1a closest to the inlet opening 6a, a series of branch lines or conduits 7c which connect the conduit 7b with the remaining lower chambers 1a in the right-hand zone of the trough T, and a series of branch lines 7d for connecting the conduit 7a with the lower pressure chambers 1a in the left-hand zone of the tubular trough. Each of branch lines 7c, 7d and the line 7b beyond the extreme right-hand line 7c contains a pressure regulating valve 8 which controls the pressure of compressed air admitted to the individual chambers or compartments 1a. Consequently, it is possible to so control the pressures prevailing in the chambers 1a and in the chambers 3a thereabove, that the drop in pressures prevailing in adjacent upper chambers, as seen in the direction toward the discharge opening 6, is nearly or completely uniform. Pressure losses are thus avoided because the lower pressure zone, i.e., the left-hand zone of the receptacle T, receives compressed air only from the first compressor 9a. The second compressor 10 raises the pressure of air discharged from the compressor 9a through the conduit 7a and advances the twice compressed air into the compartments 1a located in the right-hand zone of the trough T, i.e. into that zone which is closer to the inlet opening 6a.

The operation of the pneumatic conveyor PC' is the same as that of the conveyor shown in FIGS. 1 and 2. Because different pressures prevail in the adjacent chambers 3a, the pulverulent material M is caused to advance along the perforated horizontal bottom 2 and is discharged through the outlet 6. Losses in compressed air are greatly reduced because the chambers 1a, 3a close to the discharge opening are fed with compressed air which has passed a single compression stage, i.e. with air discharged by the first compressor 9a through the line 7a and branch lines 7d. Moreover, the pressure of air entering the compartments close to the discharge opening 6 may be further reduced by suitable adjustment of regulating valves 8 in the branch lines 7d.

It will be readily understood that the conveyor PC' may operate with three or more compressors, particularly if the trough T is one of considerable length. A third compressor will then receive precompressed air from the compressor 10 and will feed the compartments 1a closest to the inlet opening 6a; the compressor 10 will supply twice-compressed air to the central group of lower compartments; and the compressor 9a will deliver once-compressed air to the compartments 1a closest to the discharge opening 6.

FIG. 4 illustrates a slight modification of the pneumatic conveyor shown in FIG. 3. The tubular receptacle or trough T of the conveyor PC" is inclined upwardly in a direction from the inlet 6a toward the discharge opening 6. Depending upon the extent to which the perforated bottom 2 is inclined from horizontal, the upper portion or half 3 of the trough T must contain a larger or lesser number of baffles 4. In the embodiment of FIG. 4, the length of each chamber 3a equals one-half the length of a compartment 1a, i.e. each compartment 1a feeds compressed air to two upper chambers and each second baffle 4 is aligned with one partition 11. Of course, it is equally possible to further reduce the length of chambers 3a, for example, in such a way that the length of one compartment 1a equals the combined length of three upper chambers. In such instances, each third baffle is aligned with a partition 11. The number of upper chambers 3a increases with the inclination of the elongated tubular member T.

The arrangement of compressors 9a, 10, of conduits 7a—7d and valves 8 in the conveyor PC" is the same as in the apparatus of FIG. 3. If the length of receptacle T is considerable, the conveyor PC" may operate with three or more compressors in the manner as described in connection with FIG. 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A pneumatic conveyor for pulverulent materials which comprises, in combination: an elongated tubular trough having a first end, a second end, a gas-permeable bottom extending between said ends for dividing the trough into an upper and a lower portion, an inlet adjacent to one of said ends and located above said bottom, and an outlet located at the other end and communicating with said upper portion; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; and means for supplying a compressed gas into said lower portion whereby the gas passes through said bottom into each pressure chamber to transform the material on said bottom into a stream of loose particles, and the gas entrapped in said chambers passing beneath said baffles toward the outlet to entrain the material in the same direction.

2. A pneumatic conveyor for pulverulent materials which comprises, in combination: an elongated tubular horizontal trough having a first end, a second end, a gas-permeable horizontal bottom extending between said ends for dividing the trough into an upper and a lower portion, an inlet adjacent to one of said ends and located above said bottom, and an outlet located at the other end and communicating with said upper portion; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; and means for supplying a compressed gas into said lower portion whereby the gas passes through said bottom into each pressure chamber to transform the material on said bottom into a stream of loose particles, and the gas entrapped in said chambers passing beneath said baffles toward the outlet to entrain the material in the same direction.

3. A pneumatic conveyor for pulverulent materials which comprises, in combination: an elongated tubular trough having a first end, a second end, a gas-permeable bottom extending between said ends for dividing the trough into an upper and a lower portion, an inlet adjacent to one of said ends and located above said bottom, and an outlet located at the other end and communicating with said upper portion, the trough being inclined in such a manner that the outlet is located at a level above the level of said inlet; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; and means for supplying a compressed gas into said lower portion whereby the gas passes through said bottom into each pressure chamber to transform the material on said bottom into a stream of loose particles, and the gas entrapped in said chambers passing beneath said baffles toward the outlet to entrain the material in the same direction.

4. A pneumatic conveyor for pulverulent materials which comprises, in combination: an elongated tubular trough having a first end, a second end, a gas-permeable bottom extending between said ends for dividing the trough into an upper and lower portion, an inlet adjacent to one of said ends and located above said bottom, and an outlet located at the other end and communicating with said upper portion; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; a plurality of transverse partitions in said lower portion, each aligned with one of said baffles, for dividing said lower portion into a series of pressure compartments; and means for supplying a compressed gas into compartments whereby the gas passes through said bottom into each pressure chamber to transform the material on said bottom into a stream of loose particles, and the gas entrapped in said chambers passing beneath said baffles toward the outlet to entrain the material in the same direction.

5. A pneumatic conveyor for pulverulent materials which comprises, in combination: an elongated tubular trough having a first end, a second end, a gas-permeable bottom extending between said ends for dividing the trough into an upper and a lower portion, an inlet adjacent to one of said ends and located above said bottom, and an outlet located at the other end and communicating with said upper portion; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; a plurality of spaced transverse partitions in said lower portion for dividing the latter's interior into a series of non-communicating pressure compartments, the distance between adjacent partitions exceeding the distance between the adjacent baffles; and means for supplying a compressed gas into each of said compartments whereby the gas passes through said bottom into each pressure chamber to transform the material on said bottom into a stream of loose particles, and the gas entrapped in said chambers passing beneath said baffles toward the outlet to entrain the material in the same direction.

6. A pneumatic conveyor for pulverulent materials which comprises, in combination: an elongated tubular trough having a first end, a second end, a gas-permeable bottom extending between said ends for dividing the trough into an upper and a lower portion, an inlet adjacent to one of said ends and located above said bottom, and an outlet located at the other end and communicating with said upper portion; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; a plurality of transverse partitions in said lower portion, each aligned with one of said baffles, for dividing said lower portion into a series of separate pressure compartments; and means for supplying a compressed gas into each of said compartments whereby the gas passes through said bottom into each pressure chamber to transform the material on said bottom into a stream of loose particles, and the gases entrapped in said chambers passing beneath said baffles toward the outlet to entrain the material in the same direction, said gas supplying means comprising a plurality of interconnected compressors for successively increasing the pressure of the gas, and a plurality of conduit means for connecting the compressors with said compartments in such manner that the gas under lower compression is introduced into the compartments closer to said outlet and the gas under higher compression is introduced into the compartments closer to said inlet.

7. A pneumatic conveyor for pulverulent materials which comprises, in combination: an elongated tubular trough having a first end, a second end, a gas-permeable bottom extending between said ends for dividing the trough into an upper and a lower portion, an inlet adjacent to one of said ends and located above said bottom, and an outlet located at the other end and communicating with said upper portion; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; a plurality of transverse partitions in said lower portion, each aligned with one of said baffles, for dividing said lower portion into a series of separate pressure compartments; and means for supplying a compressed gas into each of said compartments whereby the gas passes through said bottom into each pressure chamber to transform the material on said bottom into a stream of loose particles, and the gases entrapped in said chambers passing beneath said baffles toward the outlet to entrain the material in the same direction, said gas supplying means comprising a plurality of interconnected compressors for successively increasing the pressure of the gas, a plurality of conduit means for connecting the compressors with said compartments in such manner that the gas under lower compression is introduced into the compartments closer to said outlet and the gas under higher compression is introduced into the compartments closer to said inlet, and pressure regulating means in each of said conduit means.

8. A pneumatic conveyor for pulverulent materials which comprises, in combination: an elongated tubular trough having a first end, a second end, a gas-permeable bottom extending between said ends for dividing the trough into an upper and a lower portion, an inlet adjacent to one of said ends and located above said bottom, and an outlet located at the other end and communicating with said upper portion, the trough being inclined in such a way that the outlet is located at a level above said inlet; means for feeding a pulverulent material through said inlet and onto said bottom in such a way as to prevent discharge of gases through said inlet; a plurality of spaced transverse baffles in said upper portion extending downwardly toward but short of said bottom for dividing the interior of said upper portion into a series of communicating pressure chambers; a plurality of transverse partitions in said lower portion, each aligned with one of said baffles, for dividing said lower portion into a series of separate pressure compartments; and means for supplying a compressed gas into each of said compartments whereby the gas passes through said bottom into each pressure chamber to transform the material on said bottom into a stream of loose particles, and the gases entrapped in said chambers passing beneath said baffles toward the outlet to entrain the material in the same direction, said gas supplying means comprising a plurality of interconnected compressors for successively increasing the pressure of the gas, and a plurality of conduit means for connecting the compressors with said compartments in such manner that the gas under lower compression is introduced into the compartments closer to said outlet and the gas under higher compression is introduced into the compartments closer to said inlet.

9. A pneumatic conveyor for pulverulent materials, such as cement and the like, which comprises, in combination: an elongated tubular trough having a first end, a second end, an air-permeable bottom extending between said ends for dividing the interior of the trough into an upper and a lower portion, an inlet adjacent to one of said ends and located above said bottom, and an outlet located at the other end and communicating with said upper portion; means for feeding a pulverulent material through said inlet and onto said bottom in such a way as to prevent discharge of air through said inlet; a plurality of spaced transverse baffles in said upper portion extending downwardly toward but short of said bottom for dividing the upper portion into a series of communicating pressure chambers; at least one air compressor means; conduit means for connecting the compressor means with said lower portion; and pressure regulating valve means in said conduit means for varying the pressure of air introduced by the compressor means into said lower portion, the compressed air passing through said bottom into each pressure chamber to transform the material on said bottom into a stream of loose particles and the compressed air entrapped in said chambers passing beneath said baffles toward the outlet to entrain the material in the same direction along said bottom.

10. A pneumatic conveyor for pulverulent materials, such as cement and the like, which comprises, in combination: an elongated tubular trough having a first end, a second end, an air-permeable bottom extending between said ends for dividing the interior of the trough into an upper and a lower portion, an inlet adjacent to one of said ends and located above said bottom, and an outlet located at the other end and communicating with said upper portion, said outlet being located at a level not lower than the level of said inlet; means for feeding a pulverulent material through said inlet and onto said bottom in such a way as to prevent discharge of air through said inlet; a plurality of spaced transverse baffles in said upper portion extending downwardly toward but short of said bottom for dividing the upper portion into a series of communicating pressure chambers; at least one air compressor means; conduit means for connecting the compressor means with said lower portion; and pressure regulating valve means in said conduit means for varying the pressure of air introduced by the compressor means into said lower portion, the compressed air passing through said bottom into each pressure chamber to transform the material on said bottom into a stream of loose particles and the compressed air entrapped in said chambers passing beneath said baffles toward the outlet to entrain the material in the same direction along said bottom.

References Cited in the file of this patent

UNITED STATES PATENTS

| 1,971,853 | Thlefeldt | Aug. 28, 1934 |
| 2,527,455 | Schemm | Oct. 24, 1950 |

FOREIGN PATENTS

| 1,016,397 | Germany | Sept. 26, 1957 |